Patented Jan. 17, 1950

2,494,993

UNITED STATES PATENT OFFICE 2,494,993

MANUFACTURE OF CHLOROCRESOLS

Reginald Thomas Foster, Birkenhead, England, assignor to Imperial Chemical Industries Limited, a corporation of Great Britain No Drawing. Application July 25, 1945, Serial No. 607,084. In Great Britain April 21, 1943

6 Claims. (Cl. 260—623)

This invention relates to improvements in the manufacture of organic compounds, and more particularly to the manufacture of monochlorocresols.

In the production of nuclear chlorinated monochlorocresols it has hitherto been the practice to dissolve the cresol in a solvent such as carbon tetrachloride or glacial acetic acid and to pass in the chlorine with cooling.

According to the present invention a process for the production of monochlorocresols comprises treating a molten cresol with chlorine in the absence of a solvent until a reaction product is formed containing approximately 1 atom of chlorine per molecule. Advantageously the reaction product is submitted to fractional distillation so as to isolate at least one isomer of monochlorocresol in a substantially pure form.

The chlorination may be carried out at ordinary or elevated temperatures. Thus the reaction mixture may be cooled so as to maintain the reaction temperature below, say, 40° C., or no cooling may be employed, in which case the heat evolved during the process will cause the temperature to rise considerably above this, for example to between 80° C. and 90° C., depending on the particular conditions under which the process is conducted. It is also possible to carry out the process in the presence of a chlorination catalyst, for example, finely divided iron, ferric chloride, antimony trichloride, bromine or iodine. In many cases where toluene derivatives are chlorinated the conditions of chlorination affect the point at which the molecule reacts, low temperatures and the presence of iron, for example, favouring nuclear chlorination, while high temperatures favour side-chain chlorination. It has been found, however, in the case of the cresols that at both high and low temperatures and in either the presence of absence of a catalyst, chlorination occurs in the nucleus, and that it is thus not necessary to observe rigid control of temperature or other conditions of reaction to ensure the formation of the nuclear substituted product. Thus contrary to expectation it is possible to conduct the chlorination at elevated temperatures of the order of 80° C. to 90° C., with a consequent gain in the rate at which the process can be carried out, without incurring any risk of producing impurities in the product through side-chain chlorination.

In general a mixture of isomeric monochlorocresols is produced which may be submitted to fractional distillation followed, if desired, by other separation processes such as fractional crystallisation, to obtain fractions containing the isomers in different proportions, or to obtain the individual isomers. Such processes will also serve to remove any unreacted cresol or any dichlorocresol which may have been formed.

The reaction between the cresol and the chlorine is accompanied by the evolution of hydrogen chloride, and, if desired, the quantity of hydrogen chloride evolved may be taken as a measure of the degree of chlorination, the formation of 1 molecule of hydrogen chloride indicating the introduction of 1 atom of chlorine per molecule of the cresol. Other methods of following the course of the reaction may be employed, as for example by noting the consumption of chlorine or the increase in density of the reaction product. The chlorination may be continued until rather more than 1 atom of chlorine per molecule has reacted, for example 1 to 1.2 atoms per molecule. It is preferred, however, to stop the chlorination when rather less than 1 atom of chlorine per molecule has been introduced, say, between 0.9 atom and 1.0 atom of chlorine per molecule. Under such circumstances the formation of dichlorocresols is almost completely avoided and in consequence the subsequent fractionation process for separating the isomers present is rendered easier. Either ortho, meta or para cresol may be chlorinated as described in this specification, or mixtures of two or three of the cresols as, for example, the industrial material known as cresylic acid.

The subsequent steps of fractionating the crude product may be carried out at ordinary or reduced pressure or both in turn, and they may be followed if desired by, for example, a fractional crystallisation process.

The following examples illustrate but do not limit the invention all parts being parts by weight.

Example 1

Chlorine was passed into 198 parts of o-cresol cooled so that the temperature was kept below 55° C. at such a rate that absorption of chlorine was substantially complete. At the end of 1¼ hours the cresol had increased in weight by 66 parts and chlorination was then stopped. The product was distilled through a fractionation column at a pressure of 110 mm. mercury and fractions were collected as follows:

| Fraction | Boiling Range | Weight |
|---|---|---|
|  | °C. | Parts |
| 1 | 120–130 | 42 |
| 2 | 130–153 | 65 |
| 3 | 153–162 | 142 |
| Residue |  | 11.5 |

Fraction 2 boiling between 130° C. and 153° C./110 mm. remained liquid at −10° C. and was a mixture of 4-chloro-o-cresol and 6-chloro-o-cresol.

Fraction 3, most of which distilled over between 161° C. and 162° C., had a setting point of 35° C. and was crude 4-chloro-o-cresol.

Example 2 o-Cresol was chlorinated by passing in chlorine at such a rate that it was substantially completely absorbed, the temperature being allowed to rise to 85° C., no cooling being employed. The introduction of chlorine was continued until the product contained 1.16 atoms of chlorine per molecule. 100 parts of the product were distilled at a pressure of 110 mm. of mercury and fractions were collected as follows:

| Fraction | Boiling Range | Weight |
|---|---|---|
|  | °C. | Parts |
| 1 | Up to 130 | 1.7 |
| 2 | 130–160 | 43.6 |
| 3 | 160–163 | 50.8 |
| Residue |  | 3.8 |

Fraction 2 was a mixture of 4-chloro-o-cresol and 6-chloro-o-cresol. After distillation at ordinary pressure, in which a small, low boiling point initial fraction was discarded, this fraction was allowed to stand, when crystals of pure 4-chloro-o-cresol, M. P. 48° C. separated out.

Example 3

Chlorine was passed into 200 parts of p-cresol until the weight of the reaction mixture had increased by 70 parts, corresponding to combination with the cresol of 1.1 atoms of chlorine per molecule. During the chlorination the temperature was allowed to rise to 100° C.

The chlorinated material was then distilled at 18 mm. pressure, giving 164 parts of product boiling between 92° C. and 103° C. and a residue weighing 101 parts. The fraction boiling at 92° C. to 103° C./18 mm. was redistilled at atmospheric pressure giving 125 parts of 2-chloro-p-cresol boiling over the range 198° C. to 203° C., and leaving a residue of 83 parts.

Example 4

3357 parts of o-cresol were treated with chlorine while passing the chlorine in as rapidly as it was absorbed, the temperature being allowed to rise to between 80° C. and 90° C. Chlorination was stopped when 1022 parts of chlorine had reacted corresponding to the introduction into the cresol of approximately 0.96 atom of chlorine per molecule. 4351 parts of the chlorinated product were distilled up a 4 ft. fractionation column, random packed with ¼ in. Raschig rings, and gave the following fractions:

| Fraction | Boiling Range | Weight |
|---|---|---|
|  |  | Parts |
| 1 | Up to 70° C./10 mm | 19 |
| 2 | At 70° C./10 mm | 1,407 |
| 3 | 70° C. to 104° C./8 mm | 97.5 |
| 4 | At 104° C./8 mm | 2,77 |
| Residue |  | 67 |

Fraction 2 was 6-chloro-o-cresol containing a small amount of o-cresol and 4-chloro-o-cresol, and fraction 4 was substantially pure 4-chloro-o-cresol.

I claim:
1. A process for the production of a monochloro-cresol which comprises introducing chlorine into a solventless molten cresol at a temperature between 80° C. and 100° C., and terminating the introduction of chlorine when the reaction product contains, in combination, between 0.9 and 1.2 atoms of chlorine per molecule.

2. A process for the production of a monochloro-cresol which comprises introducing chlorine into a solventless molten cresol at a temperature between 80° C. and 100° C., and terminating the introduction of chlorine when the reaction product contains, in combination, between 0.9 and 1.0 atoms of chlorine per molecule.

3. A process for the production of monochloro o-cresol which comprises introducing chlorine into solventless molten o-cresol at a temperature between 80° C. and 100° C., and terminating the introduction of chlorine when the reaction product contains, in combination, between 0.9 and 1.2 atoms of chlorine per molecule.

4. A process for the production of monochloro-o-cresol which comprises introducing chlorine into solventless molten o-cresol at a temperature between 80° C. and 100° C., and terminating the introduction of chlorine when the reaction product contains, in combination, between 0.9 and 1.0 atoms of chlorine per molecule.

5. A process for the production of a monochlorocresol which comprises introducing chlorine into a solventless mixture of molten cresols at a temperature between 80° C. and 100° C., and terminating in the introduction of chlorine when the reaction product contains, in combination, between 0.9 and 1.2 atoms of chlorine per molecule.

6. A process for the production of a monochlorocresol which comprises introducing chlorine into a solventless mixture of molten cresols at a temperature between 80° C. and 100° C., and terminating in the introduction of chlorine when the reaction product contains, in combination, between 0.9 and 1.0 atoms of chlorine per molecule, subjecting the reaction product to fractional distillation and isolating at least one fraction consisting of a substantially pure monochlorocresol.

REGINALD THOMAS FOSTER.

REFERENCES CITED

The following references are of record in the file of this patent:

FOREIGN PATENTS

| Number | Country | Date |
|---|---|---|
| 232,071 | Germany | Mar. 4, 1911 |

OTHER REFERENCES

Von Walther et al., Jour. fur Prak. Chemie, vol. 199, N. F. 91, 367–8 (1915).

Claus et al. (A) Jour. fur Prak. Chemie, vol. 146, N. F. 38, 328–9 (1888).

Claus et al. (B) Berichte, vol. 16, 1598–9 (1883).